INVENTOR
Warren H. Mavity
BY
Murray A. Gleeson
ATTORNEY

INVENTOR
Warren H. Mavity
BY
Murray A. Gleeson
ATTORNEY

United States Patent Office 2,984,469
Patented May 16, 1961

2,984,469

TENSIONING MEANS FOR TRIMMER CHAIN OF BORING TYPE MINER

Warren H. Mavity, Blue Island, Ill., assignor to Goodman Manufacturing Company, Chicago, Ill., a corporation of Illinois Filed Apr. 25, 1958, Ser. No. 730,855

1 Claim. (Cl. 262—7)

This invention relates to improvements in mining machines of the boring type and more particularly relates to boring machines, adjustable to cut in coal seams of varying thicknesses.

A principal object of the invention is to provide a simplified and improved means for maintaining a uniform degree of tension on the trimmer chain of a boring machine, adjustable to cut in coal seams of varying thicknesses.

A further object of the invention is to improve upon the chain tensioning means of mining machines of the boring type by providing a fluid pressure operated automatic take-up for the cutter chain so arranged that the take-up means may be entirely mounted on the cutter frame for the machine.

A further object of the invention is to improve upon mining machines of the boring type having spaced vertically adjustable trimmer bars by providing a simplified and improved compact hydraulically actuated mechanism for maintaining a uniform tension on the cutter chain of the machine, wherein a step-up drive connection is provided between hydraulic power means and a tensioning idler, taking up tension on the chain, and reducing the travel of the hydraulic power means required to maintain tension on the chain as cutter bars are vertically adjusted, and thereby increasing the compactness of the tensioning means to the extent that it may be mounted on the cutter frame for the machine.

Figure 1:
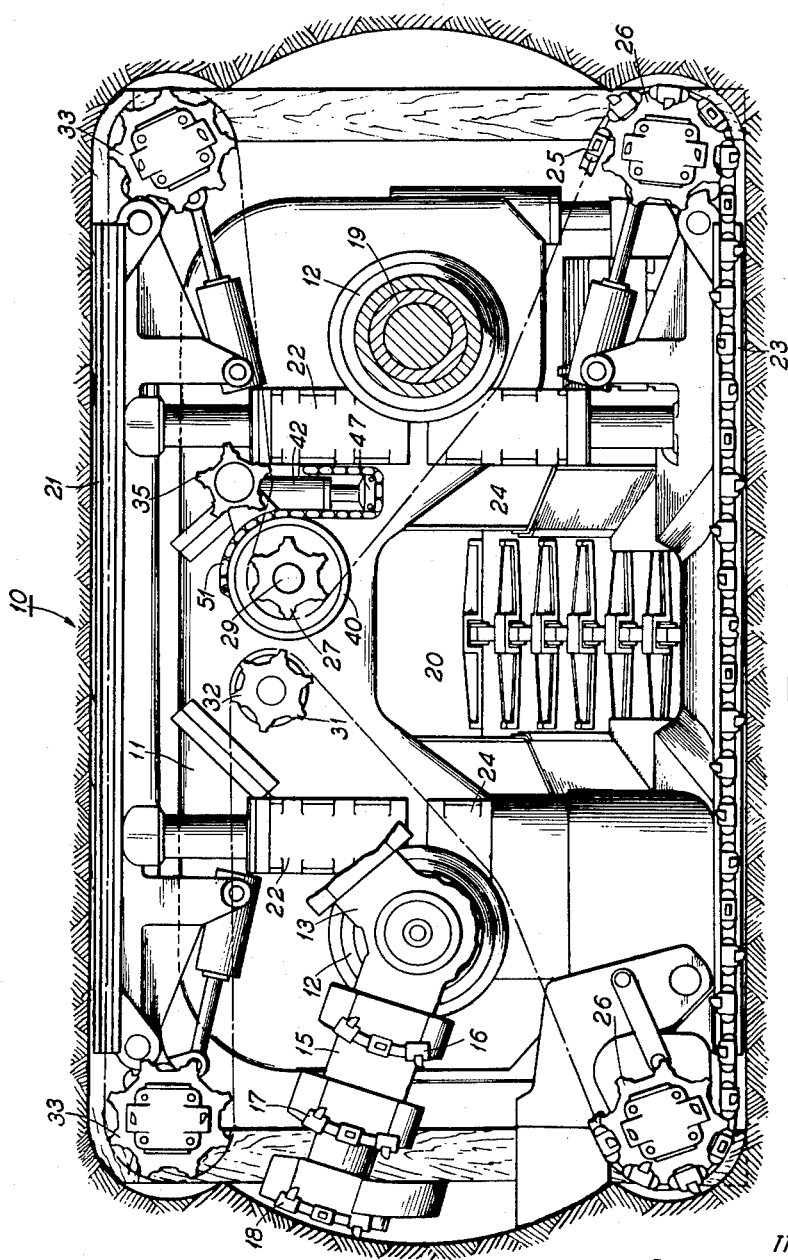
Figure 2:
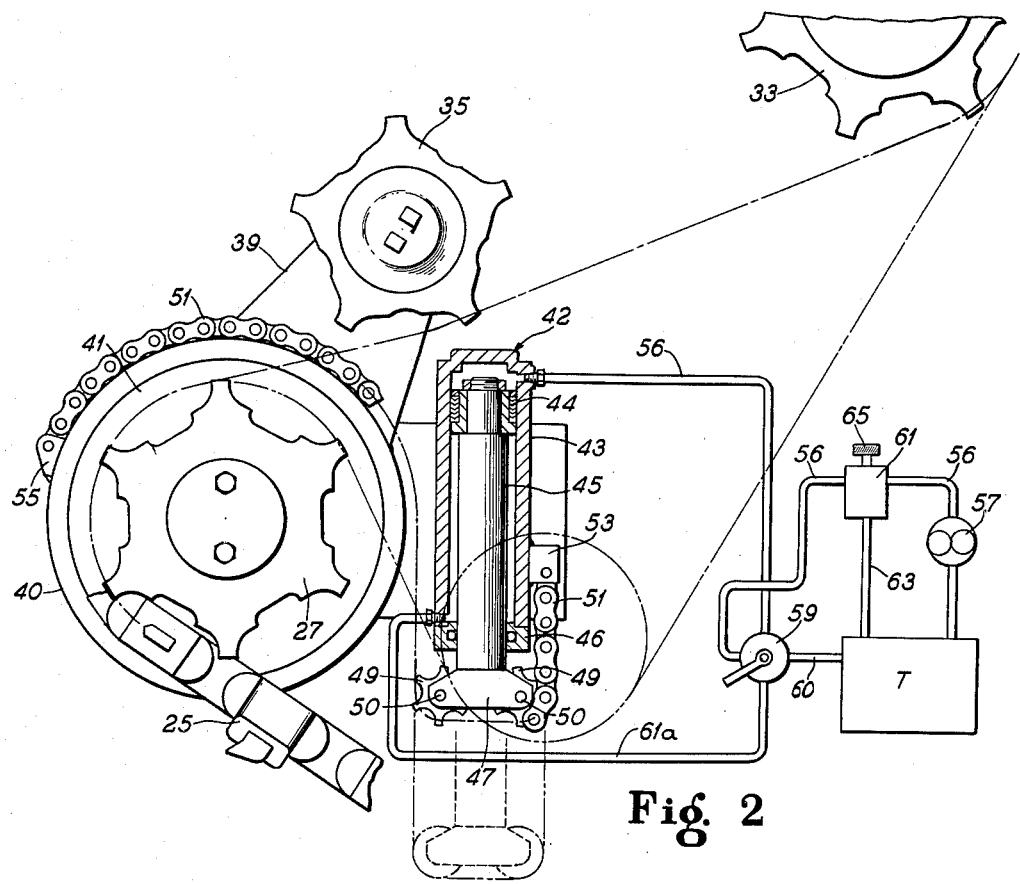
Figure 3:
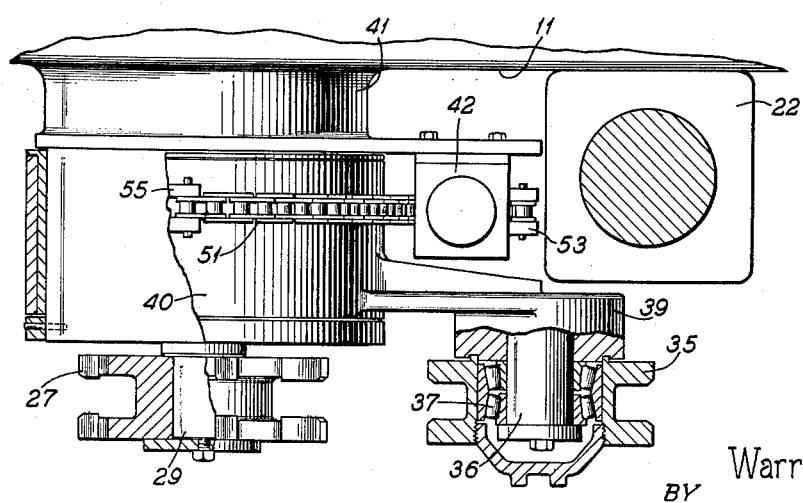

These and other objects of the invention will appear from time to time as the following specification proceeds and with reference to the accompanying drawings wherein:

Figure 1 is a front end view of a continuous mining machine of the boring type, illustrating one form that the tensioning means of the invention may take;

Figure 2 is an enlarged fragmentary detail end view looking toward the front end of the machine, with the tensioning cylinder shown in section and diagrammatically illustrating a fluid pressure operated system for maintaining a uniform pressure within the tensioning cylinder: and Figure 3 is a fragmentary plan view of the tensioning means with certain parts broken away and certain other parts shown in horizontal section, in order to more clearly illustrate certain details of the invention not shown in Figures 1 and 2.

In the drawings, I have shown a continuous mining machine 10 of the boring type, which is vertically adjustable to operate in coal seams of varying thicknesses. The boring machine, as generally shown in Figure 1, includes a gear casing or cutter frame 11, mounted on a main frame (not shown) of the machine for vertical adjustment with respect thereto. The cutter frame 11 has spaced forwardly extending hubs 12 forming supports for rotatable boring heads 13.

The boring heads 13, as herein shown, each have radial arms 15 having radially spaced arcuate cutters 16, 17 and 18, the outermost cutter 18 being radially adjustable to adjust the boring head to the desired cutting height of the machine. The boring heads 13 are driven from hollow shafts 19, journalled within the hubs 12 and driven in opposite directions through suitable gear reduction drives (not shown), journalled within the gear casing or cutter frame 11 and driven from a suitable motor (not shown), which may be mounted on the main frame of the machine in a manner common to boring types of continuous mining machines of the class described. The boring heads 13 are driven in opposite directions, to rotate toward each other along the ground and progress the cut and broken down material toward the center of the machine to be picked up by an inclined elevating conveyor 20.

The gear casing or cutter frame 11 also forms a support for an upper cutter or trimmer bar 21, mounted on said frame on laterally spaced hydraulic jacks 22 and operable to vertically adjust the trimmer bar 21 to the required cutting height of the machine, and to retain said trimmer bar in a selected adjusted cutting position.

The cutter frame 11 also forms a support for a lower trimmer bar 23, shown as extending parallel to the upper trimmer bar 20 and supported on the cutter frame 11 by hydraulic jacks 24, depending from said cutter frame. The hydraulic jacks 24 are shown as being in vertical alignment with the hydraulic jacks 22 and are suitably connected to the lower trimmer bar to vertically adjust said trimmer bar with respect to the cutter frame 11 in a well known manner.

The trimmer bars 20 and 23 have the usual endless cutter chain 25 guided for movement therealong for trimming the depending and upstanding cusps left between the boring heads 13. The cutter chain 25 is trained about corner sprockets 26 at opposite ends of the lower trimmer bar 23 and extends angularly inwardly and upwardly therefrom, one run of said cutter chain being trained about a drive sprocket 27 suitably secured to a drive shaft 29, to be rotatably driven therefrom.

The opposite run of the cutter chain 25 is trained about an idler sprocket 31 mounted on the cutter frame 11 on a shaft 32, extending outwardly from said cutter frame.

The two runs of the cutter chain are trained about corner sprockets 33 at opposite ends of the cutter bar 21, and are guided for movement along said cutter bar to cut out the cusps depending from the mine roof between the boring heads 13.

The tensioning means for maintaining a uniform degree of tension on the cutter chain 25 in the various positions of adjustment of the cutter bars 21 and 23 with respect to the cutter frame 11 includes a tension idler 35, herein shown as being a sprocket meshing with the cutter chain 25 and tensioning said cutter chain to the extent required to effect efficient operation thereof and to maintain the tension of the cutter chain uniform for all positions of adjustment of the cutter bars 21 and 23 with respect to the cutter frame 11.

The tension idler 35 is shown as being rotatably mounted on a stub shaft 36 on anti-friction bearings 37 (Figure 3). The stub shaft 36 is mounted on and extends forwardly from a rocking arm 39, herein shown as extending laterally from and as being formed integrally with a rocking sleeve 40. The rocking sleeve 40 is rockingly mounted on a hub 41, projecting forwardly of the cutter frame 11 and having the drive shaft 29 for the sprocket 27 journalled therein.

A hydraulic cylinder and piston unit 42 is mounted on the forward end of the cutter frame 11 and extends vertically along, to maintain sufficient pressure on the arm 39 and tension idler 35 to maintain a uniform tension on the cutter chain, as the cutter bars 21 and 23 are adjusted to their various positions of adjustment. The hydraulic cylinder and piston unit 42 includes a cylinder 43, herein shown as being mounted on the cutter frame 11 and having a piston 44 therein. A piston rod 45 forms a mounting for the piston 44 and slidably extends through a head 46 for the cylinder 43. A yoke-like carrier 47 is mounted on the outer end of the piston rod 45 and extends laterally beyond said piston rod in opposite directions. Idler sprockets 49 are mounted on the yoke-like carrier 47 for free rotation with respect thereto, on shafts 50 mounted at their opposite ends in said carrier.

A flexible step-up drive connection is provided between the piston rod 45 and the sleeve 40, which is herein shown as being a chain 51 secured at one end to a lug 53 projecting outwardly from the wall of the cylinder 43 and extending downwardly therefrom. The chain 51 is trained about the two spaced idler sprockets 49 and upwardly from the inner idler sprocket. From the inner idler sprocket the chain 51 is wrapped about the periphery of the sleeve 40 for a portion of the circumference thereof, and is shown as being connected to said sleeve on spaced lugs 55 extending radially outwardly from the periphery of the sleeve 40.

Thus, as fluid under pressure is applied to head end of the cylinder 43 the arm 39 will be rocked in a clockwise direction to maintain the sprocket 35 in engagement with the chain 25 and to maintain tension on said chain in accordance with the pressure of the fluid entering the cylinder 43 and acting on the piston 44. It should here be noted that the sprockets 49 about which the chain 51 is trained form a reduction between the piston rod 45 and the sleeve 40, reducing by half the movement of the piston rod 45 required to maintain tension on the chain, as the cutter bars are adjusted to their extreme retracted positions.

The cylinder and piston unit 42 is shown in Figure 2 as being a double-acting cylinder and piston unit, to accommodate release of the tension idler 35 from the cutter chain 25 when it is desired to replace the chain or a lug therein. In Figure 2, a pressure line 56 is shown as connecting a pump 57 to the head end of the cylinder 43. The pressure line 56 has a four-way valve 59 therein, positionable to connect the head end of the cylinder 43 to tank through a return line 60 and to connect the pump 57 to the piston rod end of the cylinder 43 through a pressure line 61a, in cases where it is desired to positively retract the piston rod and direction changing idlers 49. The valve 59 is also positionable to connect the piston rod end of the cylinder 43 to tank through the return line 60 and to connect the pump to the head end of the cylinder 43. This is the normal position of the valve 59. The pressure line 56 also had a relief valve 61 therein connected to tank through a return line 63.

The relief valve 61 may be an adjustable relief valve, adjusted by operation of an adjustment knob 65 to adjust the pressure in the head end of the cylinder 43 as in application Serial No. 651,027 filed by Walter Silks on April 5, 1957, and now Patent No. 2,877,005.

When the relief valve 61 is properly adjusted, and during adjustment of the trimmer bars 21 and 23 with respect to the frame 11, pressure is maintained on the piston 43, to extend the piston rod 45 as the cutter bars are moved closer together and to accommodate the chain 25 to retract the piston rod 45 within the cylinder 43 as the cutter bars 21 and 23 are moved farther apart. The pressure of fluid entering the head end of the cylinder 43, may thus be adjusted to maintain a uniform tension on the cutter chain 25 when the cutter bars 21 and 23 are in their inwardly retracted and outwardly extended cutting positions, and in all intermediate positions of said cutter bars with respect to the cutter frame.

While I have herein shown and described one form in which my invention may be embodied, it should be understood that various modifications and variations of the invention may be effected without departing from the spirit and scope of the novel concepts of the invention as defined by the claims appended hereto.

I claim as my invention:

In a mining machine of the boring type having a plurality of laterally spaced boring heads for forming contiguous bores in advance of the machine, a frame, upper and lower horizontally extending cutter bars extending transversely of the machine and mounted on said frame immediately to the rear of said boring heads for vertical adjustment with respect thereto, an endless chain guided for movement along both of said cutter bars, a drive sprocket and an idler sprocket rotatably mounted on said frame in inwardly spaced relation with respect to opposite ends of said cutter bars and between the latter, tensioning means for said cutter chain, comprising a freely rotatable sleeve mounted on said frame coaxial with one of said sprockets, a rocking arm extending radially from said sleeve, a tension idler on the free end of said rocking arm and meshing with said cutter chain, a self-adjusting connection between said frame and said rocking arm comprising a vertically extending cylinder fixedly mounted on said frame to one side of the axis of rocking movement of said rocking arm and spaced inwardly therefrom closely adjacent said sleeve, a piston rod extensible from the lower end of said cylinder beneath said rocking arm, a motion multiplying connection between said piston rod and said rocking arm comprising a direction changing member on the lower end of said piston rod, a flexible drive member fixedly connected with said frame at one end on the outer side of said cylinder and extending along and fixedly connected to said sleeve at its opposite end, said flexible drive member extending downwardly along the outer side of said cylinder around said direction changing member and upwardly along the periphery of said sleeve to the point of connection thereto, and means maintaining a predetermined pressure in said cylinder and biasing said piston rod to extend from said cylinder to maintain a uniform tension on said cutter chain in all positions of vertical adjustment of both of said cutter bars with respect to said main frame.

References Cited in the file of this patent

UNITED STATES PATENTS

| | | |
|---|---|---|
| 1,954,345 | Burrows | Apr. 10, 1934 |
| 2,743,093 | Robbins | Apr. 24, 1956 |
| 2,777,102 | Barrett | Jan. 8, 1957 |
| 2,868,526 | Jamison et al. | Jan. 13, 1959 |
| 2,877,005 | Silks | Mar. 10, 1959 |